United States Patent
Torkelson et al.

(10) Patent No.: US 9,695,255 B2
(45) Date of Patent: *Jul. 4, 2017

(54) PEROXY-DERIVATIVE FUNCTIONALIZATION OF POLYPROPYLENE VIA SOLID-STATE SHEAR PULVERIZATION

(71) Applicant: Northwestern University, Evanston, IL (US)

(72) Inventors: John M. Torkelson, Skokie, IL (US); Jeanette M. Diop, Evanston, IL (US)

(73) Assignee: Northwestern University, Evanston, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/206,978

(22) Filed: Jul. 11, 2016

(65) Prior Publication Data

US 2016/0319049 A1    Nov. 3, 2016

Related U.S. Application Data

(63) Continuation of application No. 14/428,600, filed as application No. PCT/US2013/061240 on Sep. 23, 2013, now Pat. No. 9,388,256.

(60) Provisional application No. 61/704,177, filed on Sep. 21, 2012.

(51) Int. Cl.
| | |
|---|---|
| *C08F 8/14* | (2006.01) |
| *C08F 110/06* | (2006.01) |
| *C08F 8/00* | (2006.01) |
| *C08F 8/06* | (2006.01) |
| *C08F 10/06* | (2006.01) |

(52) U.S. Cl.
CPC ............... *C08F 8/14* (2013.01); *C08F 8/00* (2013.01); *C08F 8/06* (2013.01); *C08F 10/06* (2013.01); *C08F 110/06* (2013.01)

(58) Field of Classification Search
CPC .................................. C08F 8/06; C08F 110/06
USPC ........................................................ 525/333.8
See application file for complete search history.

(56) References Cited

U.S. PATENT DOCUMENTS

| | | | |
|---|---|---|---|
| 5,705,568 A * | 1/1998 | Gahleitner | C08F 110/06 524/525 |
| 5,814,673 A | 9/1998 | Khait | |
| 6,180,685 B1 | 1/2001 | Khait | |
| 6,818,173 B1 * | 11/2004 | Khait | B29B 9/08 264/310 |
| 7,223,359 B2 | 5/2007 | Torkelson et al. | |
| 7,906,053 B1 * | 3/2011 | Torkelson | B29C 47/0004 264/176.1 |
| 2007/0200272 A1 * | 8/2007 | Horst | C08F 8/50 264/211.24 |

OTHER PUBLICATIONS

Assoun, L. et al, Carboxylation of polypropylene by reactive extrusion with functionalized peroxides, Polymer, vol. 39, No. 12, 1998, p. 2571-2577.
Furgiuele, N. et al., "Efficient Mixing of Polymer Blends of Extreme Viscosity Ratio: Elimination of Phase Inversion via Solid-State Shear Pulverization", Polym. Eng. Sci. 2000, 40(6), 1447-1457.
Walker, A. et al., "Polyethylene/starch Blends with Enhanced Oxygen Barrier and Mechanical Properties: Effect of Granule Morphology Damage by Solid-State Shear Pulverization", Polymer 2007, 48, 1066-1074.
Lebovitz, A. et al., "Sub-micron Dispersed-phase Particle Size in Polymer Blends: Overcoming the Taylor Limit via Solid-State Shear Pulverization", Polymer 2003, 44, 199-206.
Tao, Y. et al., "Achievement of Quasi-nanostructured Polymer Blends by Solid-State Shear Pulverization and Compatibilization by Gradient Copolymer Addition", Polymer 2006, 47, 6773-6781.
Furgiuele, N. et al., "Novel Strategy for Polymer Blend Compatibilization: Solid-State Shear Pulverization", Macromolecules 2000, 33(2), 225-228.

* cited by examiner

*Primary Examiner* — Robert C Boyle
(74) *Attorney, Agent, or Firm* — Reinhart Boerner Van Deuren s.c.

(57) ABSTRACT

Functionalization of polymers, including polyolefins, via decomposition of organic peroxides through the use of solid-state shear pulverization.

26 Claims, 6 Drawing Sheets

US 9,695,255 B2

PEROXY-DERIVATIVE FUNCTIONALIZATION OF POLYPROPYLENE VIA SOLID-STATE SHEAR PULVERIZATION

This application is a continuation of and claims priority to and the benefit of application Ser. No. 14/428,600 filed Mar. 16, 2015 and issued as U.S. Pat. No. 9,388,256 on Jul. 12, 2016, which claimed priority to and the benefit of International Application no. PCT/US2013/061240 filed Sep. 23, 2013, which claimed priority to and the benefit of application Ser. No. 61/704,177 filed Sep. 21, 2012—each of which is incorporated herein by reference in its entirety.

BACKGROUND OF THE INVENTION

Polypropylene (PP), a chemically resistant commodity plastic, is occasionally functionalized with polar moieties in order to improve its compatibility with more polar polymers and fillers in composites. For example, in immiscible polymer blends (e.g., PP/Nylon blends), functionalized PP can be used to obtain reactive compatibilization as a result of in situ reaction between the polar moieties on the functionalized PP and the polar component of the blend (e.g., nylon). The most commonly produced (and studied) system of functionalized PP is maleic anhydride grafted PP (PP-g-MA). Currently, commercial production of PP-g-MA is achieved via melt processing, with PP being processed in the presence of low levels of initiator and maleic anhydride monomer. Melt processing, however, is accompanied by drastic molecular weight reduction of PP, which in turn results in dramatic loss in material properties of the product as compared to that of the neat PP from which it was made. The molecular weight reduction is caused by a free-radical chemistry (β-scission) that is highly dependent on temperature. (See FIG. 1.) As processing temperature increases, the rate of β-scission increases dramatically (See, Ratzsch, M.; Arnold, M.; Borsig, E.; Bucka, H.; Reichelt, N. *Progress in Polymer Science* 2002, 27, 1195-1282 and Dickens, B. *Journal of Polymer Science: Polymer Chemistry Edition* 1982, 20, 1169-1183). Because melt processing is carried out at high temperatures (e.g., ~190-220° C.), the degree of β-scission and molecular weight reduction are typically quite significant. As a result, there remains an on-going concern in the art to develop an alternate, effective process for the preparation of functionalized polyolefins. This need has been recognized and documented clearly in the research literature: The incorporation of functional groups along the backbone of polyolefins such as polyethylene and polypropylene in a selective, controlled, and mild manner is one of the most important challenges currently facing synthetic polymer chemists. (See, Boaen, N. K.; Hillmyer, M. A. *Chemical Society Reviews* 2005, 34, 267-75.)

SUMMARY OF THE INVENTION

In light of the foregoing, it is an object of the present invention to provide one or more methods for the grafting and/or incorporation of various functional groups onto a polymer, thereby overcoming various deficiencies and shortcomings of the prior art, including those outlined above. It will be understood by those skilled in the art that one or more aspects of this invention can meet certain objectives, while one or more other aspects can meet certain other objectives. Each objective may not apply equally, in all its respects, to every aspect of this invention. As such, the following objects can be viewed in the alternative with respect to any one aspect of this invention.

It can be an object of the present invention to provide one or more methods to graft carbonyl moieties onto a polymer backbone.

It can also be an object of the present invention to provide one or more methods to functionalize a polymeric resin using a peroxide only.

It can be another object of the present invention to provide one or more methods for incorporation of carbonyl functional groups, via the addition of benzoyloxy radicals, into a polymeric resin to impart one or more functional effects thereto.

It can be an object of the present invention to provide one or more methods for the incorporation of an organic peroxide decomposition product (e.g., acyloxy or alkoxy radicals), into a polymeric resin to impart one or more functional effects to the resin.

It can be an object of the present invention, alone or in conjunction with one or more of the preceding objectives, to provide a polymeric material comprising at least one propylene monomeric unit comprising a pendent carbonyl moiety—such a moiety as can undergo further reaction and/or such a polymeric material as can be used to compatibilize polypropylene with more polar polymer and composites.

It can also be an object of the present invention, alone or in conjunction with one or more of the preceding objectives, to provide a polymeric material functionalized with carbonyl or other moieties for which the extent of molecular weight reduction can be controlled by the type of post-pulverization processing Other objects, features, benefits and advantages of the present invention will be apparent from this summary and the following descriptions of certain embodiments, and will be readily apparent to those skilled in the art having knowledge of various polymer functionalization techniques. Such objects, features, benefits and advantages will be apparent from the above as taken into conjunction with the accompanying examples, data and all reasonable inferences to be drawn therefrom. In part, the present invention can be directed toward a method of preparing a functionalized polymer. Such a method can comprise providing a mixture comprising a polymer component and an organic peroxide; and applying a mechanical energy to such a mixture through solid-state shear pulverization in the presence of cooling at least partially sufficient to maintain such a polymer in a solid state during pulverization. Such pulverization can be at least partially sufficient to graft a peroxy derivative onto such a polymer component and provide a functionalized polymer.

As would be understood by those skilled in the art made aware of this invention, such a polymer or component thereof can have a C—H bond susceptible to homolytic cleavage and/or reaction with a peroxide free-radical decomposition product or derivative. Without limitation, such a polymer can be selected from polyolefins, polyesters, polyamides, epoxides, elastomers, copolymers thereof and combinations of such polymers and copolymers, or as would otherwise be known to those skilled in the art. In certain embodiments, such a polymer component can be selected from polyolefins, co-polymers of such polyolefins and combinations thereof. In certain such embodiments, such a polymer component can be selected from polyethylene, polypropylene and co-polymers thereof.

Without limitation, and organic peroxide useful in the context of this invention can be selected from disubstituted peroxides of a formula RO—OR', where R and R' are independently selected from alkyl, cycoalkyl, alkenyl, alkenoyl, acryloyl, aryl, aroyl and acyl groups (or a corresponding ketal or hemiketal); and such a peroxy derivative can be selected from alkoxy, cycloalkoxy, alkenyloxy, alkenoyloxy, acryloyloxy, aroxy, aroyloxy and acyloxy (or a corresponding ketal or hemiketal) moieties. In certain embodiments, benzoyl peroxide can be utilized, with a peroxy derivative comprising a benzoyloxy moiety. Regardless, such an organic peroxide can comprise about 0.01 wt % to about 10 wt % of such a mixture.

With respect to any polymer component(s) utilized, such a mixture can comprise a filler component. Without limitation, such a filler can be selected from cellulose, rice husk ash, talc, silica, modified clay, unmodified clay, modified graphite, unmodified graphite, graphene, single-walled carbon nanotubes, multi-walled carbon nanotubes and combinations thereof, together with various other filler components known to those skilled in the art made aware of this invention. Such a component can comprise about 0.1 wt % to about 50 wt % of such a mixture, or as would otherwise needed to provide desired functional effect or material property.

Such a functionalized polymer can be melt-mixed and, optionally, injection molded. Regardless, such a functionalized polymer can subsequently be incorporated into an article of manufacture.

In part, the present invention can be directed toward a method of preparing a functionalized polymer. Such a method can comprise providing a mixture comprising a polymer comprising a polypropylene component and an organic peroxide component; and applying a mechanical energy to such a mixture through solid-state shear pulverization in the presence of an element of cooling at least partially sufficient to maintain such a mixture in a solid state, such pulverization as can be at least partially sufficient to graft a corresponding peroxy derivative onto such a polypropylene component and provide a polymer functionalized with a corresponding moiety. Polymer and peroxide components (and, optionally, filler components) useful in such embodiments can be as discussed above or illustrated elsewhere herein.

In part, the present invention can also be directed toward a method of using solid-state shear pulverization in the benzoyloxy functionalization of polypropylene. Such a method can comprise providing a polypropylene (e.g., isotactic or atactic) and benzoyl peroxide component mixture; introducing such a mixture into a solid-state shear pulverization apparatus, such an apparatus as can comprise a cooling component at least partially sufficient to maintain mixture solid state; and shear pulverizing such a mixture, such pulverization as can be at least partially sufficient to graft a benzoyloxy moiety onto a polypropylene component.

In part, the present invention can also be directed compositionally to a polymer. Such a polymer can comprise polypropylene with one or a plurality of propylene monomeric units comprising a pendent benzyloxy moiety, such monomeric units as can be randomly distributed within such a polymer, and such a polymer the solid-state shear pulverization product of polypropylene and benzoyl peroxide. In certain embodiments, such a polymer product can comprise up to about 0.15 wt. % of such a benzoyloxy moiety. In certain embodiments, such a moiety can be up to about 0.50 wt. % or more of such a polymer product. Benzoyloxy grafting percentage can be or approach 100%. Regardless, carbonyl content can be at least partially sufficient to provide one or more functional effects, including but not limited to compatibilization of a blend of polypropylene with a more polar polymeric component (e.g., without limitation, nylon) or composite.

DETAILED DESCRIPTION OF CERTAIN EMBODIMENTS

Figure 1:
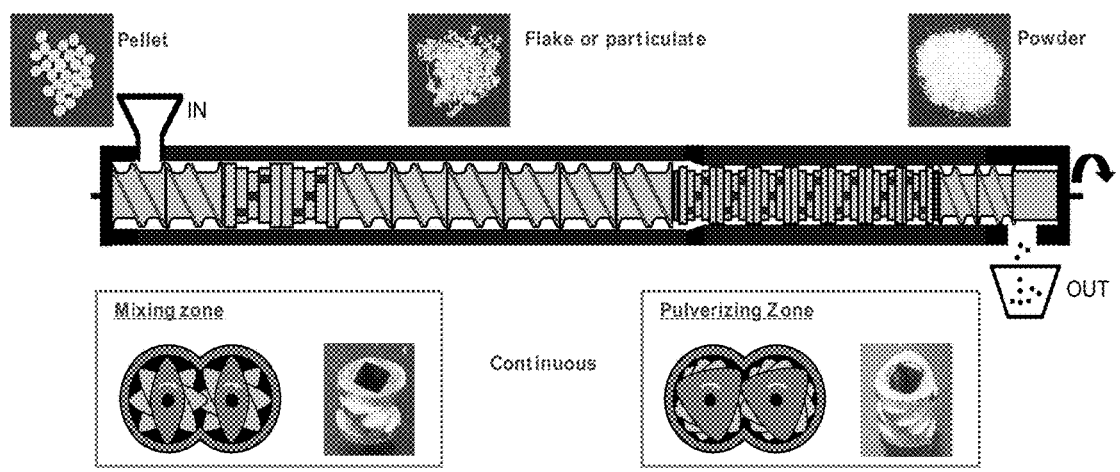
FIG. 1: SSSP Apparatus of the sort useful in conjunction with certain embodiments of this invention.

As relates to certain non-limiting embodiments, this invention provides a method of functionalizing PP with benzoyloxy and related carbonyl groups via solid-state shear pulverization (SSSP). Taking advantage of unique near ambient temperature chemistries associated with SSSP, PP functionalization is achieved with suppressed molecular weight reduction. This carbonyl functionalized PP can be employed in applications that would otherwise utilize PP-g-MA.

Use of SSSP in conjunction with the present invention provides several advantages over existing technologies, including but not limited to:

Near ambient temperature conditions associated with SSSP provide advantages relating to chemistries that are otherwise unattainable under melt processing conditions. In particular, these unique chemistries enable functionalization of PP with carbonyl groups (e.g., based on the addition of alkoxy or acyloxy radicals that are produced from the decomposition of organic peroxides). This type of functionalization is not observed under melt processing conditions by virtue of the high processing temperatures that are used.

Carbonyl functionalization, as achieved via SSSP, results in a product that has the potential to undergo branching at elevated temperatures without the use of poly-functional monomers (as is done for branching of PP under melt conditions with organic peroxides).

The near-ambient temperature conditions utilized in SSSP allow for the suppression of β-scission during processing; this results in the suppression of molecular weight reduction during SSSP. On the contrary, the high temperatures used in melt processing result in dramatic molecular weight reduction because of the increased rates of β-scission.

Unlike ball milling and solvent processing, SSSP is a continuous, industrially scalable, and high throughput process.

Compared to solvent processing, SSSP avoids the use of copious amounts of hazardous solvents.

Relative to other processing methods, SSSP is very versatile as a result of the ease with which product properties can be fine-tuned by changing operating conditions (e.g., screw design, screw speed, and zone temperatures).

As discussed below, major benefits from an SSSP apparatus employed in conjunction with the present methodologies relate to the ability to cool or maintain the barrel at a temperature sufficiently low enough to ensure that the polymeric material remains in the solid state during pulverization. These major benefits also relate to the use of tri-lobe and/or bi-lobe screw elements along a portion of the pulverizer screw. Details regarding SSSP processes and equipment (e.g., component construction, screw elements, transport elements, kneading or shearing elements, and spacer elements and/or the sequence or design thereof selected or varied as required to accommodate a polymer starting material, pulverization parameters and/or a resulting pulverized polymer product) are known to those skilled in the art made aware of this invention. (See, e.g., Furgiuele, N.; Lebovitz, A. H.; Khait, K.; Torkelson, J. M. *Macromolecules* 2000, 33, 225-228; Furgiuele, N.; Lebovitz, A. H.; Khait, K.; Torkelson, J. M. *Polym Eng. Sci* 2000, 40, 1447-1457; Lebovitz, A. H.; Khait, K.; Torkelson, J. M. *Macromolecules* 2002, 35, 8672-8675; Kasimatis, K. G.; Torkelson, J. M. *PMSE Prepr* 2005, 92, 255-256; Tao, Y.; Kim, J.; Torkelson, J. M. *Polymer* 2006, 47, 6773-6781; Walker, A. M.; Tao, Y.; Torkelson, J. M. *Polymer* 2001, 48, 1066-1074; Lebovitz, A. H.; Khait, K.; Torkelson, J. M. *Polymer* 2003 44, 199-206; Brunner, P. J.; Clark, J. T.; Torkelson, J. M.; Wakabayashi, K. *Polymer Engineering and Science* 2012, 52, 1555-1564; and U.S. Pat. Nos. 5,814,673; 6,180,685; and 7,223,359— each of which is incorporated herein by reference in its entirety.)

More specifically, in the context of this invention, SSSP is carried out in a "pulverizer," a Model ZE 25 Berstoff twin-screw extruder modified with a cooling system. The screw design for this modified extruder is made up of two segments. The first segment is made up of spiral conveying and bi-lobe kneading elements in the first segment; the second segment is made up of tri-lobe shearing elements. This pulverizer has a barrel length-to-diameter ratio of 26.5. In the first segment, where the screw elements have a diameter of 25 mm, the length-to-diameter ratio of the barrel is 19. The second segment has screw elements with a diameter of 23 mm and length-to-screw diameter ratio of 7.5 for the barrel. The cooling system, which operates at −6° C., is controlled by circulating a 60/40 wt % glycol/water mixture using a Budzar Industries WC-3 chiller. Such low operating temperatures allow materials to be processed in their solid state (i.e., below their melting or glass temperatures). This pulverizer uses high shear and compressional forces to cause fragmentation and fusion of materials. Processing in the solid-state helps to overcome thermodynamic and kinetic limitations that may be associated with melt processing. It also suppresses degradation that occurs as a result of β-scission under high temperature conditions. As well as being continuous, SSSP is environmentally benign and scalable to commercial levels.

In general, SSSP is not limited to the system described above. The components for accomplishing SSSP include an extruder that is modified with a cooling or heat transfer medium such that materials are retained in the solid state during pulverization. This modification may involve, but is not limited to a cooling system and medium jacketed around the barrel, and/or a cooled screw, and/or a heat transfer system and medium that operates at a temperature above room temperature and is jacketed around the barrel. Pulverization itself is accomplished via the use of an extruder that has bi-lobe elements or tri-lobe elements or a combination of bi- and tri-lobe elements, such that sufficient work can be can be performed on the material in its solid-state to result in the desired reaction.

With reference to FIG. 1, an SSSP apparatus utilizes mixing, conveying, and pulverization zones, each with a different combination of conveying, mixing, and shearing elements. The level of the applied shear stress can be tuned by altering the type of screw applied. For example, using reverse shearing elements results in making the screw "harsher" and increases the residence time in the apparatus; using forward shearing elements results in making the screw less "harsh" and reduces the residence time. The material enters as pellets but exits the pulverizer in the solid state as powder, flakes, or particulate.

To functionalize PP with benzoates and related carbonyl groups, an organic peroxide (e.g., benzoyl peroxide (BPO)) is used as the initiator. The resulting pulverization products were purified and pressed into thin films for Fourier Transform Infrared (FTIR) spectroscopy. The purification was done by dissolution in boiling xylene followed by precipitation with methanol, which has proven to be the most reliable method of removing any unreacted maleic anhydride from the samples. The FTIR spectra were collected at room temperature and used to characterize the carbonyl group functionalization of PP. To determine the level of carbonyl grafting onto PP a calibration curve was created using blends of octadecyl acrylate (ODA) and PP. For all spectral analyses, the data in the regions of interest (between 1800 and 1650 $cm^{-1}$ and between 750 and 900 $cm^{-1}$) were deconvoluted into component peaks using a Lorentzian function. The calibration curve based on ODA was used to quantitatively characterize the amount of carbonyl moieties grafted onto PP. Up to 1.14 wt % or more can be realized for pulverized samples.

FIG. 2, below, shows a comparison between FTIR spectra of a sample of carbonyl functionalized PP synthesized via melt processing (dotted line) or pulverization (bold line); it also shows the FTIR spectrum of neat PP (dashed line). The comparison in FIG. 3 shows the presence of a strong absorbance peak for the pulverized sample at 1723 $cm^{-1}$ and the absence of this absorption for melt processed sample. This peak is associated with absorption by ester functional groups in carbonyl groups. Pulverized samples also show distinct absorbance peaks at ~740 $cm^{-1}$ as a result of phenyl groups from the BPO used.

Unique chemistries associated with SSSP afford direct functionalization of PP with organic peroxides by taking advantage of the temperature dependence of peroxide decomposition. Scheme 1, below, shows the decomposition of BPO. The process begins with the cleavage of the O—O bond to produce benzoyloxy radicals in step 1. The benzoyloxy radical then undergoes decarboxylation to produce phenyl radicals and release carbon dioxide. The second step is highly dependent on temperature and significantly less likely to occur under near-ambient temperature conditions. (See, Chateauneuf, J.; Lusztyk, J.; Ingold, K. U. *Journal of*

American Chemical Society 1988, 110, 2886-2893.) Using SSSP, it is possible to functionalize PP with benzoyloxy, as well as other alkoxy and acyloxy radicals.

Scheme 1: Decomposition of BPO

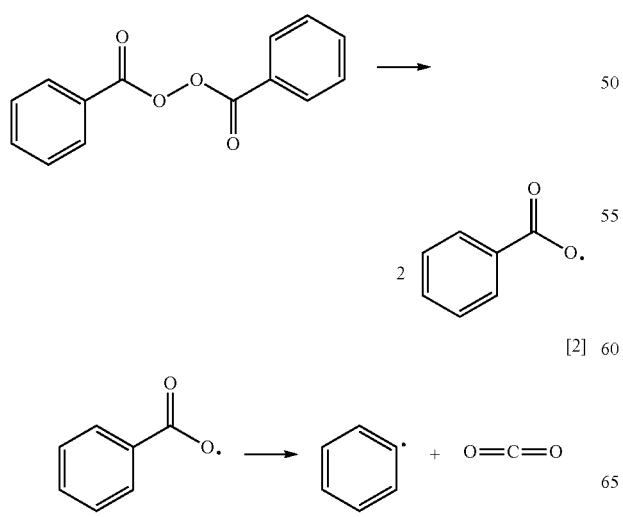

Scheme 2 shows a proposed mechanism for carbonyl functionalization of PP. During SSSP the rate of decarboxylation (see step 2) is significantly suppressed, resulting in a higher prevalence of benzoyloxy radicals formed in step 1 and allowing for the grafting of PP with benzoates. However, during melt processing, the rate of decarboxylation is high resulting in a higher prevalence of phenyl radicals and subsequently, no grafting of PP with benzoates. In the absence of step 2, which should be negligible at the SSSP T conditions, the theoretical yield of grafted benzoate is 100%. FTIR spectra (FIG. 2, discussed above) confirms the formation of carbonyl functionalized PP via SSSP.

Scheme 2: Proposed mechanism for ester functionalization of PP using BPO.

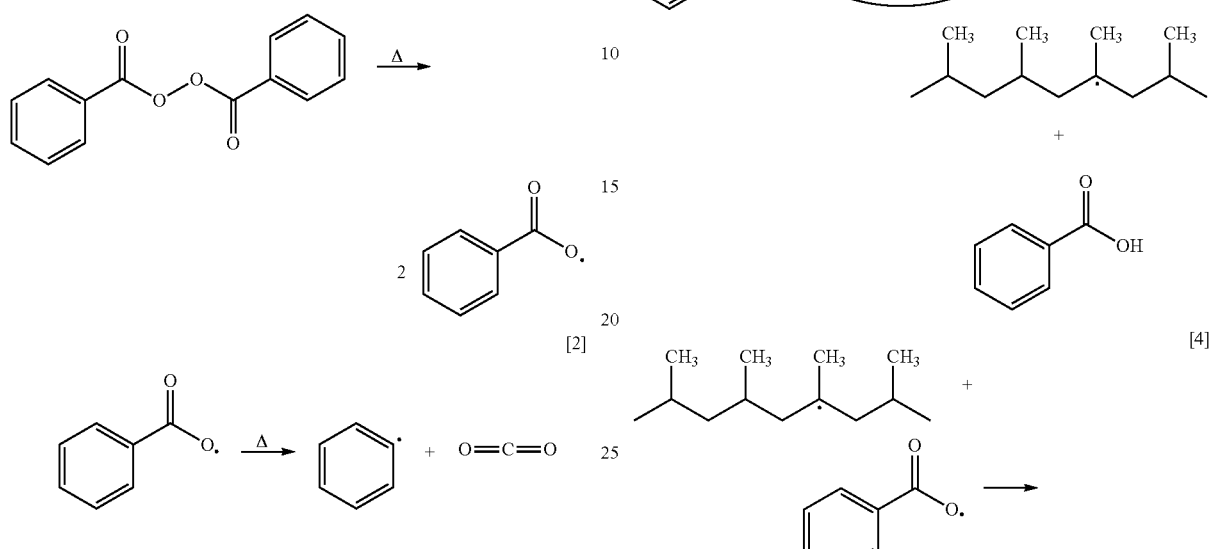

The present invention not only provides a route to PP functionalization impossible via melt processing, but also provides a route to prepare functionalized PP while suppressing β-scission and the resulting molecular weight reduction. The mechanism for β-scission and corresponding molecular weight reduction are illustrated in Scheme 4. β-scission is highly dependent on temperature: as processing temperature increases (e.g., via melt processing), the extent of β-scission increases dramatically. (See, Dickens, B. *Journal of Polymer Science: Polymer Chemistry* Edition 1982, 20, 1169 1183; Borsig, E.; Hrckova, L.; Fiedlerova, A.; Lazar, M.; Ratzsch, M.; Hesse, A. *Journal of Macromolecular Science, Part A: Pure and Applied Chemistry* 1998, 35, 1313-1326; and Tzoganakis, C.; Vlachopoulos, J.; Hamielec, A. E. Engineering 1988, 28.) Utilizing near-ambient temperature conditions associated with SSSP, the present invention can suppress β-scission and molecular weight reduction.

Scheme 3: Mechanism for β-scission

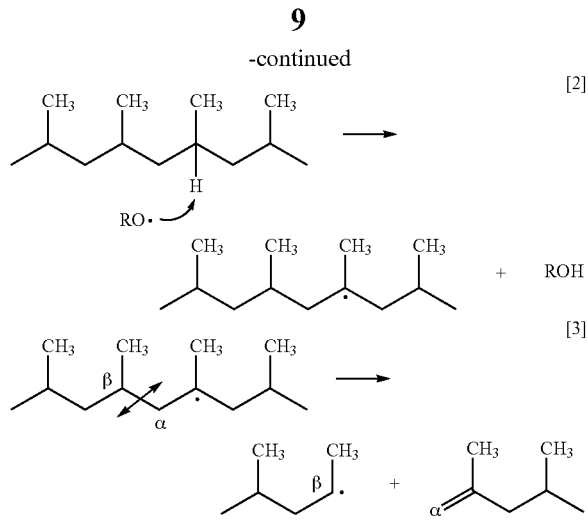

Table 1, below, summarizes levels of carbonyl functionalization, as well as percent reduction in weight average molecular weight ($M_w$) for these samples. (Reference is made to Tables 2 and 3 in the Examples for more complete data.) As discussed more fully below, the extent of molecular weight reduction was approximated from oscillatory shear rheology data using the relationship between zero shear rate viscosity ($\eta_o$) and weight average molecular weight ($M_w$) for an entangled and monodisperse polymer, $\eta_o \sim M_w^{3.4}$, (See Fox, T. G.; Flory, P. J. *Journal of Physical and Colloid Chemistry* 1951, 55, 221-234; Ferry, J. D. *Viscoelastic Properties of Polymers*; Wiley: New York, 1980 p. 641.) The product of SSSP was first annealed under vacuum and at 60° C. in order to remove any undecomposed BPO that could cause additional molecular weight reduction during melt processing after SSSP. Oscillatory shear rheology data were collected at 180° C. and with a 10% strain (using 25 mm parallel discs) after the annealed sample had been consolidated into a 25 mm disc. Listed in Table 1 below are the $\eta_o$ of as received neat PP pellets and 2 samples of carbonyl functionalized PP. The extent of weight average molecular weight reduction was determined relative to that of the neat PP from which the samples were made.

TABLE 1

Molecular weight reductions, grafting levels, and grafting yields observed for pulverized samples of ester functionalized PP (PP-g-ES)

| Sample | Mw Reduction (%) | Grafting level (wt %) | Grafting Yield (%) |
|---|---|---|---|
| Neat PP - SSSP | 3 | — | — |
| PP-g-ES/1 | 20 | 0.22 | 87 |
| PP-g-ES/2 | 29 | 0.33 | 65 |
| PP-g-ES/3 | 36 | 0.46 | 61 |

Rheology data presented, herein, are based on samples that were annealed under vacuum at 50° C. During this process, much of the undecomposed BPO was removed by vacuum suction. However, as a result of the temperature that is utilized, there is potential for some of the BPO to decompose and produce radicals that engage in chain transfer with the PP; this will result in additional molecular weight reduction. There is an opportunity to control the extent of molecular weight reduction that occurs as a result by post-pulverization chain transfer caused by BPO that decomposes after pulverization. This can be achieved by varying the temperature at which the powdered SSSP product is annealed under vacuum. By decreasing the temperature, the rate of BPO decomposition will be decreased, thus decreasing the extent of molecular weight reduction. For example, if the powdered SSSP product is annealed under vacuum at room temperature the undecomposed BPO will be lost via sublimation without undergoing significant decomposition to form radicals that could then cause molecular weight reduction of the PP when the radicals engage in chain transfer with the polymer. There is also the possibility of directly melt processing the product of SSSP either by attaching a melting apparatus to the pulverization apparatus or by melting in an entirely separate equipment after pulverization. This will, however, result in the formation of carbonyl functionalized PP with greater molecular weight reduction (due to the activity of BPO that remains undecomposed after pulverization).

Figure 3:
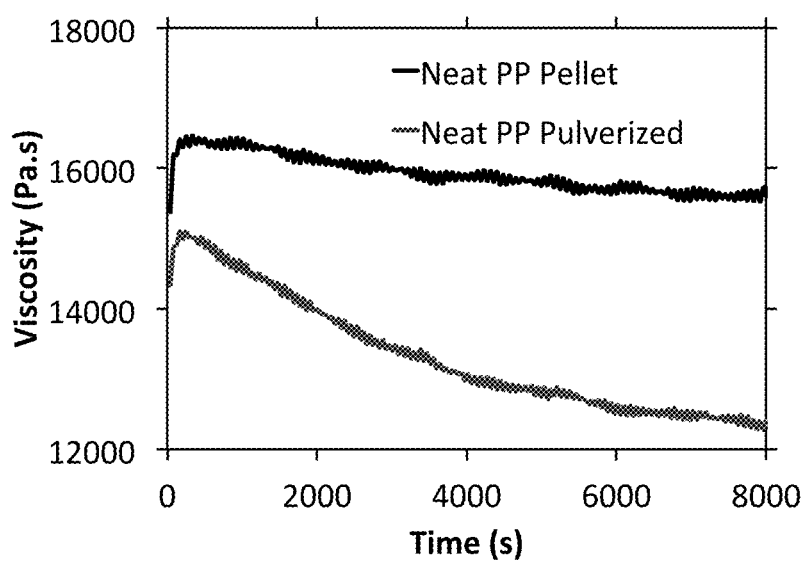
FIG. 3: Viscosity as a function of time for neat PP pellet (as received) and neat PP (pulverized). The data was collected at 180° C. using cone and plate and a 0.01 s-1 shear rate.
Figure 4:
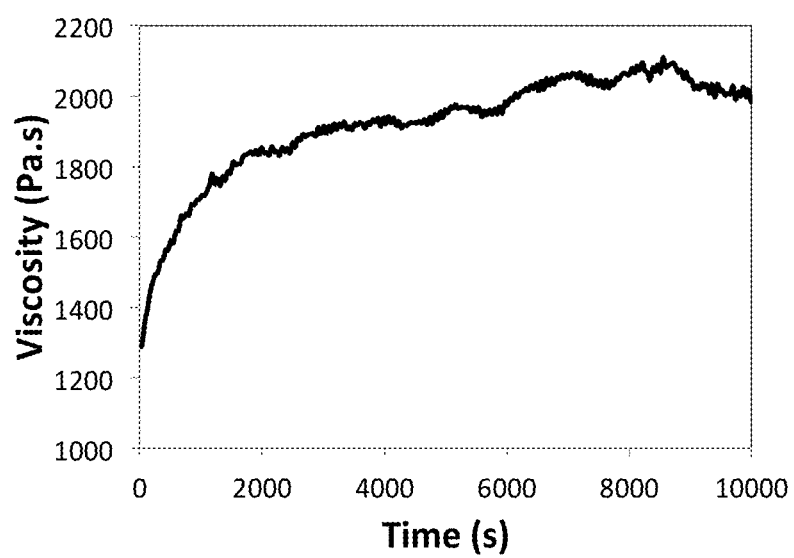
FIG. 4: Viscosity as a function of time for 1 wt % BPO pulverized with PP. The data was collected at 180° C. using cone and plate and a 0.01 s-1 shear rate.

When a polymer is subjected to extended periods of high temperature processing the viscosity of the polymer decreases with time due to thermal degradation. To study this effect, transient step rate measurements were collected using 25 mm cone and plate fixtures, with a 0.01 s$^{-1}$ rate, at 180° C., and using compression molded discs of samples. FIG. 3 below shows viscosity as a function of time for neat PP pellet (as received) and neat PP (pulverized). The decrease in viscosity over time is clearly observed for both samples shown in FIG. 3. In contrast, a sample of 1 wt % BPO pulverized with PP (for which significant levels of carbonyl functionalization of PP was observed after purification) shows an increase in viscosity with time; this is shown clearly in FIG. 4. This suggests that the carbonyl functionalized PP is set up to undergo reactions at elevated temperatures; these reactions then cause the increase in viscosity. The increase in viscosity is likely a result of (but not limited to) branching, which is possibly caused by, but not limited to, ether formation during elevated temperature processing.

EXAMPLES OF THE INVENTION

The following non-limiting example and data illustrate various aspects and features relating to the methods of the present invention, including the preparation of functionalized polymers as are available through the synthetic methodologies described herein. In comparison with the prior art, the present methods provide results and data which are surprising, unexpected and contrary thereto. While the utility of this invention is illustrated through the use of several polymer components and organic peroxide components which can be used therewith, it will be understood by those skilled in the art that comparable results are obtainable with various other polymers and peroxides, as are commensurate with the scope of this invention.

Materials.

Polypropylene (Total Petrochemicals; MFI=1.5 g/10 min; ASTM standard D-1238 at 230° C./2160 g load; reported by the supplier) was used as received. Benzoyl peroxide was used as received (SigmaAldrich). Xylene, octadecyl acrylate (ODA), and 1-pyreneacetic acid (Pyr-AA) were used for characterizing grafting degrees and reactivity of the PP-g-ES and were used as received (SigmaAldrich). A phenolic antioxidant, Songnox 6260 (Songwon), was used as received in samples made for rheological characterization.

Example 1

Synthesis of PP-g-ES with SSSP.

The PP and BPO were pulverized using a relatively harsh screw design at 200 rpm screw speed and 100 g/hr feed rate. The pulverizer was a pilot-plant/research scale Berstoff twin-screw extruder (screw diameter=25 mm, length/diameter=26.5) modified with a cooling system (a Budzar Industries WC-3 chiller operating at −6° C.); the same apparatus was used in previous SSSP studies. (It should be noted that the T of the solid-state polymer in the pulverizer may, at various locations, exceed room temperature by several tens of degrees and be warm to the touch upon exiting the pulverizer.) Samples of PP-g-ES were prepared by SSSP using 0.5 to 6.0 wt % BPO in the feed. A PP-g-ES sample prepared with 3 wt % BPO was also prepared by melt mixing for 10 min at 200° C. with an Atlas Electronic Devices MiniMAX molder (cup-and-rotor mixer) at maximum rotor speed and with three steel balls in the cup to provide chaotic mixing. Table 2 shows sample composition and process methods.

tography (high-T GPC) and physical and mechanical property characterization were purified by washing with acetone and annealing at 50° C. for 48 hr.

Sublimation and decomposition occur simultaneously during the annealing process; the rate of decomposition increases with increasing T, while that of sublimation decreases with increasing T. Because BPO decomposition could lead to additional MW reduction, its removal by sublimation is preferred in cases where MW reduction must be minimized. Approximations of the time required to remove excess BPO by sublimation can be determined using the equation for the rate of sublimation: $dm/dt = P\alpha[M/(2\pi RT)]^{1/2}$ where $dm/dt$ is change in mass per unit time per unit area, P is the vapor pressure of the solid, $\alpha$ is a vaporization coefficient ($\alpha=1$ in vacuum), M is molecular weight, R is the ideal gas constant, and T is absolute temperature. Thus, one can control the relative extents of sublimation and decomposition by varying annealing T and time. For example, by decreasing the annealing T, sublima-

TABLE 2

Variables for Sample Composition, Processing Method, and Characterization of benzoate grafting degrees, crystallinity, and tensile properties for neat PP and PP-g-ES samples made via SSSP

| Sample | Amount of BPO Added (wt %) | Processing Method | Grafting Degree[a] (wt %) | Grafting Degree[a] (mol %)[b] | Grafting Yield (%) | Crystallinity (%) | Young's Modulus (MPa) | Yield Strength (MPa) |
|---|---|---|---|---|---|---|---|---|
| Neat PP pellets (as received) | — | | — | — | — | 45 | 1250 ± 80 | 36 ± 1 |
| Neat PP (after SSSP) | — | SSSP | — | — | — | 44 | 1170 ± 60 | 35 ± 1 |
| PP-g-ES/1 | 0.5 | SSSP | 0.22 | 0.08 | 87 | 41 | 1270 ± 30 | 36 ± 1 |
| PP-g-ES/2 | 1.0 | SSSP | 0.33 | 0.12 | 65 | 42 | 1190 ± 30 | 34 ± 1 |
| PP-g-ES/3 | 1.5 | SSSP | 0.46 | 0.18 | 61 | 41 | 1130 ± 30 | 32 ± 1 |
| PP-g-ES/4 | 3.0 | SSSP | 0.81 | 0.30 | 52 | 42 | 1190 ± 60 | 32 ± 2 |
| PP-g-ES/5 | 6.0 | SSSP | 1.14 | 0.41 | 36 | 40 | 1080 ± 40 | 29 ± 1 |
| PP-g-ES/4MM | 3.0 | Melt Mixing | — | — | — | — | — | — |

[a]Grafting degree can also be expressed in μeq (i.e., micromoles of benzoates in 1 g of PP-g-ES) by simple stoichiometric calculations (e.g., 0.22 μeq is equivalent to 0.18 wt % benzoate grafted onto PP).
[b]Functionalization in mol % represents the number of moles of benzoates per mole of repeat units.

Example 2

Purification of PP-g-ES.

To ensure high purity and the absence of contaminants, PP-g-ES samples employed for quantification of carbonyl grafting, contact angle measurements, and demonstration of reactivity were purified to remove unreacted BPO by dissolution in boiling xylene followed by precipitation with methanol. The samples were dried under vacuum at 70° C. for 24 hr. The PP-g-ES samples for rheology were purified using a variety of methods that combined washing with acetone and annealing under vacuum; samples were annealed either at room T for 96 hr or at 50° C. for 48 hr. For each annealing condition, two sets of samples were studied: one set was washed with acetone before annealing and the other was not washed before annealing. For the washing step, 100 g PP-g-ES was stirred in 300 mL acetone for 3 hr at room T; the PP-g-ES was then removed by filtration. The PP-g-ES samples used in high-T gel permeation chromation will be become the dominant of the two process though more time will be required to remove the same amount of BPO.

Example 3

Quantification of Carbonyl Grafting.

In order to create a calibration curve, ODA/PP blends were prepared by melt processing at 200° C. in a MiniMAX molder for 10 min and at maximum rotor speed with three steel balls in the cup in order to provide chaotic mixing. Blend products were compression molded into thin films (~0.3 mm thick) for Fourier transform infrared (FTIR) spectroscopy using a PHI hot press coupled with a PHI cold press. Octadecyl acetate was chosen because of its structural similarity to PP-g-ES. For each blend, three sets of FTIR data were collected with 64 scans and 4 cm$^{-1}$ resolution. Purified PP-g-ES samples were compression molded into thin films (~0.3 mm thick) and tested under the same conditions as ODA/PP blends.

Example 4

Rheological Measurements.

Neat PP and PP-g-ES samples were tested with 0.5 wt % Songnox 6260 added to each sample to prevent thermal degradation. Samples were compression molded into discs devoid of bubbles using PHI presses. Small amplitude oscillatory shear data were collected at 180° C., with 2% strain over a frequency range of 0.01 to 100 rad/s (measuring from high to low frequency), using a strain-controlled Rheometrics Scientific ARES rheometer equipped with 25 mm parallel plates.

Example 5

Physical and Mechanical Properties.

Thermal analysis employed a Mettler Toledo differential scanning calorimeter (DSC 822e). Samples were heated at 40° C./min to 200° C., held at 200° C. for 5 min, cooled at 40° C./min to 40° C., held at 40° C. for 3 min, heated at 10° C./min to 200° C., held at 200° C. for 5 min, and cooled at 10° C./min to 40° C. The crystallinity was determined from the final cooling step.

Films with ~0.7 mm thickness were prepared by pressing in a PHI hot press at 200° C. for 5 min and then rapidly cooling in a PHI cold press for 15 min. Tensile specimens were prepared according to ASTM D1708; dumbbell-shaped specimens were cut from films using a Dewes-Gumbs die. An MTS Sintech 20/G (100 kN load cell; crosshead speed=5 cm/min) was used to obtain Young's modulus and yield strength values at room T.

Example 6

Contact Angle Measurement.

Neat PP and PP-g-ES samples were compression molded into thin films (~0.3 mm thick) with smooth surfaces using a PHI hot press at 200° C. for 5 min and then rapidly cooling in a PHI cold press for 10 min. The static contact angle of a droplet of deionized water (5 μL) on the surface of each disc was determined using a KRUS Drop Shape Analysis System, DSA 100; results for each sample were averaged over 20 measurements. Reported values of contact angle measurements have ±1° experimental errors.

Example 7

Demonstration of Reactivity of PP-g-ES with Pyr-AA.

10 g/L PP-g-ES samples were dissolved in 0.30 g/L solutions of Pyr-AA in xylene. Solutions were held at 130° C. for 4 hr, after which PP-g-ES was precipitated with methanol. To remove unreacted Pyr-AA, samples were purified six times by dissolution in boiling xylene and precipitation in methanol. Pyrene label fluorescence was measured with a Photon Technology International fluorimeter ($\lambda_{exc}$=344 nm).

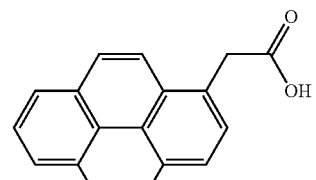

1-pyreneacetic acid (Pyr-AA)

Example 8

Quantitative Characterization of Ester Functionalization Levels on PP-g-ES: FTIR Spectroscopy.

Figure 5:
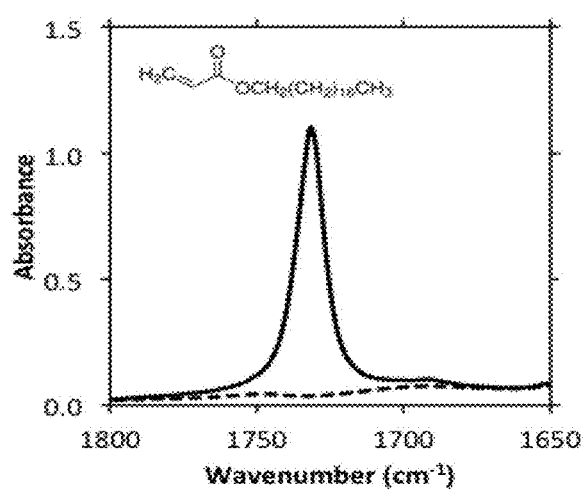
FIG. 5: FTIR spectra of a blend of and ODA/PP blend containing 155 µeq ODA, i.e., 5 wt % ODA in ODA/PP blend, (solid curve) and neat PP (dashed curve). The inserted molecular structure is that of octadecyl acrylate (ODA).

FIG. 5 compares FTIR spectra of neat, as received PP and a sample containing 5.0 wt % ODA in an ODA/PP blend. The peak at 1732 cm$^{-1}$ is present only for the ODA/PP blend and is associated with the ODA ester functional group. The inset in FIG. 5 is the chemical structure of ODA. A peak at 841 cm$^{-1}$, specific to PP and absent for BPO, is used for normalization of each sample spectrum. For spectral analyses, the data between 1800 and 1600 cm$^{-1}$ and between 930 and 740 cm$^{-1}$ were deconvoluted into component peaks using a Lorentzian function. This yielded accurate peak intensities while accounting for peak overlaps and inconsistent baselines between spectra. A calibration curve based on ODA was determined using $$[Ester]=0.25(A_{1732}/A_{841}) \qquad \text{Eq. 1}$$

where [Ester] is the grafting degree and measured in mol % (i.e., moles of benzoate per mole of PP repeat unit) and $A_{1732}$ and $A_{841}$ are the areas under the peaks at 1732 and 841 cm$^{-1}$, respectively. The grafting yield was calculated using $$\text{Grafting Yield}=([Ester]/[BPO]_o) \times 100\% \qquad \text{Eq. 2}$$

where [Ester] is as defined in Eq. 1 and $[BPO]_o$ is the initial amount of BPO added during SSSP; both variables were measured in mol %. (It must be noted that if each of the two benzoyloxy radicals resulting from the dissociation of BPO were to be grafted to PP, then the grafting yield would be 200%. Of course, for this to occur, all PP radicals would have to be generated solely by chain scission accompanying SSSP, without any chain transfer reactions. Chain scission has been shown to accompany SSSP of PP, albeit at quite limited levels, under harsh pulverization conditions and decreasing with decreasing levels of work done on the PP during SSSP.) Grafting degrees and yields of PP-g-ES samples were determined using Eqs. 1 and 2 and are reported in Table 2; grafting degrees are presented in both mol % and wt %.

Example 9

Figure 2A:
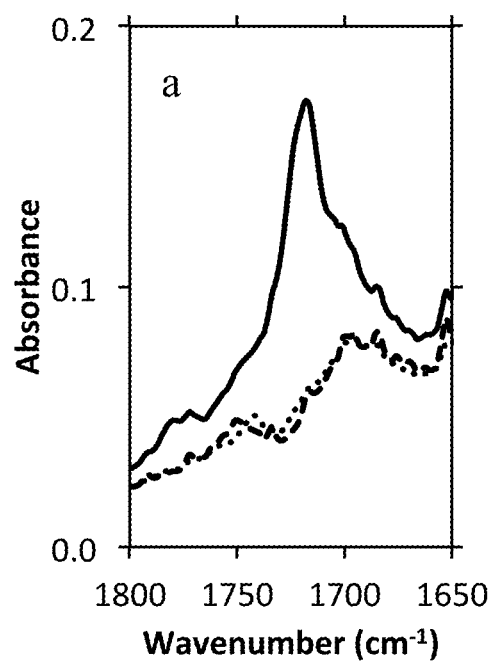
FIGS. 2A-B: FTIR spectra of ester functionalized PP synthesized via SSSP (solid curve), ester functionalized PP synthesized via melt processing (dotted curve), and neat PP as received (dashed curve) in spectral ranges of (A) 1800-1650 $cm^{-1}$ and (B) 750-650 $cm^{-1}$.
Figure 2B:
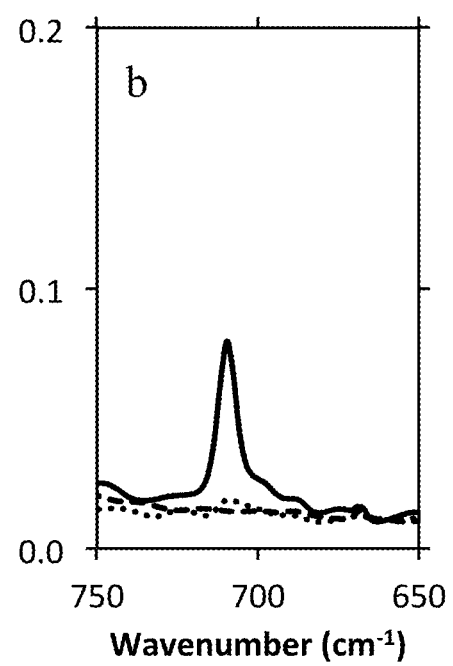

As discussed above, FIG. 2 compares the FTIR spectra of PP-g-ES/4, PP-g-ES/4MM, and neat PP pellets and confirms the presence of a strong absorbance peak for PP-g-ES/4 at 1720 cm$^{-1}$ and the absence of this absorption for the melt processed sample (see FIG. 2a). As explained, this peak is associated with ester functional groups; the slight shift of this peak to a lower wavenumber (as compared to the ester peak observed for ODA) is expected for aromatic esters. FIG. 2b shows an absorbance at ~740 cm$^{-1}$ for PP-g-ES/4. This absorbance is associated with phenyl group attachment to the PP backbone and is absent for PP-g-ES/4MM, which confirms that no significant functionalization of an ester or addition of a phenyl group can be achieved using BPO via high T melt processing. The absence of functionalization during melt processing can be understood from the T dependence of BPO dissociation into radicals.

Example 10

Reference is made to Table 2, above. As compared to grafting yields reported in the literature for PP-g-ES synthesized with peroxyesters and unsaturated peroxides at 160-180° C. and in an inert environment, the 36 to 87% grafting yields (corresponding to 0.41 to 0.18 mol % grafting degrees, respectively) obtained during PP-g-ES synthesis via SSSP in an air environment are significantly higher. (Assoun et al. reported ~17% (and 0.02 mol %) as the largest grafting yield for a series of peroxyesters used for PP functionalization by melt extrusion at 180° C. and in an $N_2$ environment; Saule et al. reported a grafting yield of 5% for isotactic PP grafted in a 2.5 hr batch process carried out in an inert environment at 160° C. using a peroxyester. For a series of unsaturated peroxides, which were expected to significantly improve grafting yields in PP, Saule et al. reported a maximum grafting yield of ~40%.) It is evident from these comparisons that PP-g-ES synthesis from BPO via SSSP results in improvement in both grafting degree and grafting yield over the PP-g-ES counterparts that were prepared at elevated T using asymmetric peroxyesters.

Example 11

PP-g-ES MW Reduction as a Function of BPO Purification Method: Rheology Characterization.

Rheology is used to evaluate the change in PP $M_w$ caused by benzoate functionalization and consider the effect of the method used to purify the PP-g-ES of unreacted BPO and its byproducts. Before discussing such characterization of $M_w$ in detail, it is important to note that some samples did not exhibit the presence of a $\eta_o$ regime in the rheology data. Instead, even at the lowest frequency, |η*| was increasing with decreasing frequency. This behavior is believed to be associated with long-chain branching. Examples fall into two classes: 1. PP-g-ES/2 and PP-g-ES/3 that were not subjected to any purification prior to rheological testing; and 2. PP-g-ES/4 and PP-g-ES/5 that were subjected to all levels of purification, which indicates that these samples, with the highest ester functionalization levels, were branched coming out of the SSSP apparatus.

Neat PP after SSSP had $\eta_o$ that was 10% lower than that of neat PP pellets (i.e., $\eta_o$=28,500 Pa·s for neat PP after SSSP), indicating a 3% reduction in $M_w$. Thus, in the absence of BPO, SSSP causes nearly negligible MW reduction of neat PP. For PP-g-ES/1 (0.08 mol % graft level and 87% grafting efficiency) that was characterized directly as the output from the pulverizer without any purification step to remove unreacted BPO, $\eta_o$ was reduced by ~61% relative to neat PP pellets, indicating a 24% reduction in $M_w$. This $M_w$ reduction is similar to the 24% reduction measured by Assoun et al. for a PP-g-ES sample made by melt processing and asymmetric peroxy molecules which had only 0.02 mol % functionalization, one fourth that of our PP-g-ES/1 sample. When the same PP-g-ES/1 sample was subjected to various purification steps, the apparent reductions in $M_w$ from zero shear rate viscosity data were 11-12% (unwashed or washed with acetone, followed by room T annealing under vacuum for 96 hr) and 20-21% (unwashed or washed with acetone, followed by annealing at 50° C. under vacuum for 48 hr). The results indicate that at low functionalization levels only very small amounts of β-scission leading to MW reduction occur during SSSP; this is also true even during post-SSSP annealing or processing under conditions that would lead to decomposition of unreacted BPO into radicals (i.e., annealing at 50° C.).

At moderate functionalization, PP-g-ES/2 and PP-g-ES/3 with 0.12-0.18 mol % ester, which require higher BPO levels in the feed, linear chain behavior is evident from rheology for all purification conditions except no purification. This implies that the PP-g-ES output from the pulverizer is linear in nature and only becomes branched if substantial levels of covalently attached benzoates and undecomposed BPO are present in the sample at the time it is subjected to melt processing. Based on $\eta_o$ values, $M_w$ was reduced relative to neat PP by 23-25% and 27-28% in PP-g-ES/2 and PP-g-ES/3 for samples (washed with acetone or unwashed and) annealed at room T under vacuum for 96 hr and by 30% and 36% in PP-g-ES/2 and PP-g-ES/3 for samples (washed with acetone or unwashed and) annealed at 50° C. under vacuum for 48 hr. While these values of $M_w$ reduction are not negligible, they are far below the 53 to 70% reductions reported by Saule et al., who did post-polymerization ester functionalization of PP by melt processing with asymmetric peroxy molecules.

Example 12

High-T GPC Characterization of PP-g-ES and Chain Scission Events Per PP Repeat Unit.

High-T GPC data were obtained for neat PP pellets and the linear PP-g-ES/1, PP-g-ES/2, and PP-g-ES/3. Molecular weight averages were evaluated by high-T GPC (at 145° C. with trichlorobenzene as eluent and triple-detection) at the Polymer Characterization Lab at the University of Tennessee, Knoxville, Tenn. 37996. In order to draw a comparison that reflects chain scission that could occur during the purification process, an evaluation was conducted of those samples that had been washed with acetone and annealed at 50° C. under vacuum for 48 hr and which showed larger reductions in $\eta_o$ than samples that had been annealed at room T for 96 hr. Samples were dissolved in trichlorobenzene and tested at 145° C.; data from a triple detection method were used.

It is noted that data associated with triple detection provided the worst case scenario for percent reductions in MW as compared to data from other detection methods. Using trichlorobenzene as solvent, GPC samples were run at 145° C. and analyzed with light scattering, triple detection, and universal calibration. The standard deviation of MW data from universal calibration, light scattering, and triple detection is 19,000 g/mol for $M_n$ and 17,000 g/mol for $M_w$. Percent reductions in $M_n$ and $M_w$ were highest for triple detection data for all PP-g-ES samples. For light scattering the following values were obtained: PP-g-ES/1 (9 and 22% reductions in $M_n$ and $M_w$, respectively), PP-g-ES/2 (3 and 23% reductions in $M_n$ and $M_w$, respectively), and PP-g-ES/3 (14 and 34% reductions in $M_n$ and $M_w$ respectively). For universal calibration the following values were obtained: PP-g-ES/1 (10 and 16% reductions in $M_n$ and $M_w$, respectively), PP-g-ES/2 (12 and 25% reductions in $M_n$ and $M_w$, respectively), and PP-g-ES/3 (13 and 29% reductions in $M_n$ and $M_w$ respectively). Averaged across all three detection methods, the following $M_n$ and $M_w$ values were obtained for neat PP pellets ($M_n$=142,200 g/mol and $M_w$=585,100 g/mol)

and resulted in percent reductions in $M_n$ and $M_w$ are determined as 6-18% and 21-33%, respectively for PP-g-ES samples.

Average MW values, as well as percent reduction in number average MW ($M_n$) and percent reduction in for these samples are presented in Table 3. The percent reductions in 114, as determined from high-T GPC, are in good agreement with those determined from rheology (see Table 3). As expected, the percent reduction in $M_w$ is greater than the corresponding percent reduction in $M_n$ for each sample. This is because the probability that a chain undergoes scission increases as the chain length increases thereby resulting in a greater reduction in $M_w$ than $M_n$.

The average number of scission events per chain can be determined from the $M_n$ data:

$$z_c = [M_{n,o}/M_{n,f}] - 1 \qquad \text{Eq. 3}$$

where $M_{n,o}$ is the initial $M_n$, and $M_{n,f}$ is the final $M_n$ after scission (and purification). Based on Eq. 3, $z_c$=0.10 scission events per chain for PP-g-ES/1, i.e., for every 100 original PP chains, there were 10 scission events. If we assume that each scission event resulted in the formation of a radical at each chain end, then we can expect a total of 20 benzoates to be grafted onto 110 PP chains. However, based on the 104,900 g/mol $M_n$ and 0.08 mol % grafting degree for PP-g-ES/1, we determine that ~2 benzoates are grafted per chain. Thus, for 110 chains, PP-g-ES/1 contains ~220 grafted benzoates, a factor of 11 more than the number of chain ends created. This indicates that the vast majority of benzoates are grafted along the PP backbone and not only at chain ends, that little of the benzoate grafting is due to reaction of benzoyloxy radicals with PP radicals formed by chain scission accompanying SSSP, and that the limit for grafting yield during SSSP (as defined by eq. 2) is at most slightly above 100%. This also provides further proof that during SSSP, PP macroradicals are less likely to undergo β-scission, thus allowing for benzoate functionalization along the PP backbone. Using similar analyses, $z_c$ and the number of benzoates per chain for PP-g-ES/2 and PP-g-ES/3 were determined and are shown Table 3. For both PP-g-ES/2 and PP-g-ES/3, the number of benzoates grafted onto the PP chain vastly exceeds what would have been expected if the benzoyloxy radical only terminated with PP macroradicals produced as a result of chain scission accompanying SSSP.

With $z_c$=0.10 for PP-g-ES/1 and PP-g-ES/2 and noting that $M_{n,o}$=115,000 g/mol for the neat PP starting material, it was determined that one scission event happens every 26,100 repeat units. A similar calculation indicates that one scission event happens every 12,400 repeat units in the synthesis (and purification) of PP-g-ES/3. For PP-g-ES syntheses by Saule et al. at 160° C. in inert environments and resulting in 30-40% grafting yields, we calculate that there was one scission event per 1000-2000 repeat units. Thus, PP-g-ES synthesis by SSSP results not only in higher grafting yield (62 to 87% for PP-g-ES/1, PP-g-ES/2, and PP-g-ES/3) but also in a factor of ~10 lower frequency of scission events as compared to PP-g-ES prepared by Saule et al.

For the PP-g-ES sample with only 0.02 mol % ester functional group synthesized by Assoun et al. by melt processing in an inert environment, it was calculated that one scission event occurred for every 11,800 repeat units. In comparison with PP-g-ES/1 (prepared with similar peroxide feed composition of ~0.1 mol %), the PP-g-ES prepared by Assoun et al. showed not only a much lower grafting degree as compared to its SSSP counterpart (0.08 mol % grafting degree and one scission event per 26,100 repeat units) but also a factor of 2 higher frequency of chain scission. Thus, relative to post-polymerization synthesis by melt processing, PP-g-ES synthesis by SSSP results in enhanced grafting degree and yield and in a major reduction in the frequency of chain scission events per repeat unit, which in turn causes MW reduction.

TABLE 3

MW characterization before and after functionalization via SSSP using oscillatory shear rheology and high-T GPC

| | | Rheology | | High-T GPC | | | | | |
|---|---|---|---|---|---|---|---|---|---|
| Sample | Grafting Degree (mol %) | $\eta_o$ (Pa · s) | Percent $M_w$ reduction[a] (%) | $M_n$ (g/mol) | Percent $M_n$ reduction (%) | $M_w$ (g/mol) | Percent $M_w$ reduction (%) | $z_c$ | Ester groups per chain |
| Neat PP pellets (as-received) | — | 31,800 | — | 115,000 | — | 585,300 | — | — | — |
| PP-g-ES/1 | 0.08 | 14,800 | 20 | 104,900 | 9 | 439,800 | 20 | 0.10 | 2 |
| PP-g-ES/2 | 0.12 | 9,900 | 29 | 104,400 | 9 | 422,800 | 29 | 0.10 | 3 |
| PP-g-ES/3 | 0.18 | 7,100 | 36 | 95,400 | 17 | 376,000 | 36 | 0.21 | 4 |

[a]Percent reduction in $M_w$ relative to neat PP pellets (as received) was calculated using the assumption that $\eta_o$ scales with $M_w$ to the 3.4 power

Example 13

Physical and Mechanical Properties.

Table 2, above, shows the percent crystallinity for PP-g-ES samples made by SSSP. Percent crystallinity ($\chi_{crys}$) was determined using Eq. 4:

$$\chi_{crys} = (\Delta H_f / \Delta H°_f) \times 100\% \qquad \text{Eq. 4}$$

where $\Delta H_f$ is the sample enthalpy of fusion and $\Delta H°_f$ is enthalpy of fusion for 100% crystalline PP ($\Delta H°_f$=207.1 J/g). Within experimental error, it is observed that SSSP of neat PP does not affect crystallinity. For PP-g-ES samples, there are only slight decreases in crystallinity relative to neat as-received PP, from 45% to 40-42%. This behavior can be explained by the fact that the bulky benzoate groups grafted onto the PP backbone (and possibly the presence of PP branches) disrupt crystal formation.

Table 2 also compares Young's modulus (E) and yield strength ($\sigma_y$) values of neat PP before and after SSSP with those of PP-g-ES samples. Within error, SSSP of neat PP had no effect on E and $\sigma_y$, consistent with the fact that the MW and crystallinity of neat PP before and after SSSP were little changed or identical within error. The grafting of PP with 0.08 to 0.30 mol % benzoate by SSSP results in no change E within error from the value for neat as-received PP and, at most, only a ~10% reduction in $\sigma_y$. However, with 0.41 mol % ester functionalization (sample PP-g-ES/5), there is a slightly less than 15% decrease in E and a 20% decrease in $\sigma_y$ relative to neat as-received PP, both outside experimental error. These small reductions may be expected as tensile properties of PP are closely linked to MW and crystallinity, both of which decrease slightly with benzoate grafting and are lowest for PP-g-ES/5.

Example 14

Interfacial Property Modification: Contact Angle Characterization.

In order to verify the improved wettability and polarity of PP-g-ES samples as compared to neat as-received PP, contact angles were measured for sessile drops of deionized water placed on the surfaces of smooth neat PP and PP-g-ES films. The contact angle decreases smoothly with increasing level of ester grafting (data not shown), which is consistent with the notion that functionalized PP will have improved interfacial adhesion with more polar materials as compared to the parent PP from which it was synthesized. In contrast, the contact angle of neat PP after SSSP remains unchanged, within error, as compared to the neat, as received PP. Thus, the polarity of neat PP is unaffected by SSSP processing; this is consistent with observation of the absence of ketonization or carboxylic acid formation from any radical stabilization by atmospheric oxygen. These results provide further confirmation of the ability of SSSP to achieve direct ester functionalization PP using BPO and that PP interfacial properties can be easily tuned via ester functionalization by SSSP.

Example 15

Reactivity of PP-g-ES with Pyr-AA.

Functionalized polyolefins are often used commercially as reactive compatibilizers for immiscible blends. As further proof of functionalization, the reactivity of the PP-g-ES synthesized by SS SP with Pyr-AA was investigated. Under the conditions of reaction, transesterification between PP-g-ES and Pyr-AA is expected, resulting in a covalent attachment of pyrenyl moieties to the PP backbone. The presence of pyrenyl units covalently attached to PP is easily confirmed by fluorescence spectroscopy.

Figure 6:
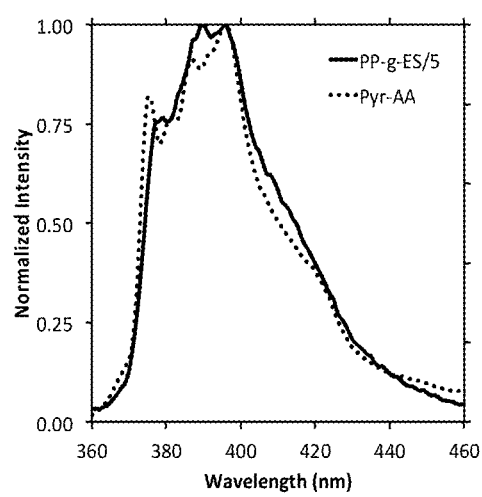
FIG. 6: Fluorescence spectra of 0.3 g/L solution of Pyr-MeNH$_2$ in xylene at 100° C. (dotted curve) and 2 g/L solution PP-g-ES/5 in xylene at 100° C. after first being reacted with Pyr-AA and then purified six times by dissolution and precipitation to remove unreacted Pyr-AA. (Both spectra have had emission intensity normalized to unity at the peak emission wavelength.)

FIG. 6 compares the fluorescence spectra of a solution of 0.3 g/L Pyr-AA in xylene and a 2.0 g/L PP-g-ES/5 solution in xylene after reaction with Pyr-AA (followed by six cycles of dissolution/precipitation to remove any unreacted Pyr-AA). The spectrum for PP-g-ES/5 shows slight shifts in pyrenyl emission peak wavelengths and structure as compared to that for Pyr-AA; these shifts have been observed in other studies and are associated with modification of photophysical responses (e.g., the polarization, intensity, and energy of the fluorescence transitions) caused by the nature of the chromophore attachment to the polymer backbone. Nonetheless, the fluorescence observed for PP-g-ES/5 after reaction with Pyr-AA provides further proof of direct functionalization of PP with benzoates using BPO only and of the potential utility of PP-g-ES as reactive compatibilizer in polymer blends. Control studies carried out on neat PP and PP-g-ES/4MM (synthesized via melt processing), using the same reaction and purification protocol as for PP-g-ES/5, resulted in no fluorescence.

In summary, as demonstrated by representative non-limiting embodiments, this invention provides a methodology for direct ester functionalization of PP using BPO, a symmetric organic peroxide; during SSSP, functionalization is made possible by both thermal and mechanochemical decomposition of BPO at the near-ambient processing T. At these T conditions, the extent of decarboxylation of the benzoyloxy radicals formed during BPO decomposition is significantly decreased, allowing for effective functionalization of PP with ester functional groups (i.e., benzoates), resulting in grafting yields of up to about 87%. Contrary to the functionalization realized by SSSP processing, the high T conditions associated with melt processing result in no grafting for a similar system of PP and BPO because of high extents of decarboxylation. Thus, SSSP provides a new platform of chemistries, which are not attainable via melt processing, for direct functionalization of PP with benzoates.

In addition to achieving PP functionalization with benzoates using BPO, we also demonstrated that this functionalization can be attained with limited reductions in $M_n$ and $M_w$; for PP-g-ES with 0.18 mol % benzoate groups, only one chain scission event happens for every 12,400 repeat units, resulting in a 17% reduction in $M_n$ and a 36% reduction in $M_w$. These moderate MW reductions are achieved because of the low processing T employed during SSSP. Under the high T conditions utilized with melt processing, the extent of β-scission, the primary cause of MW reduction, is high. By processing via SSSP, we strongly suppress the extent of β-scission and thus suppress MW reduction that could accompany functionalization.

Using contact angle measurements and based on a transesterification reaction with Pyr-AA, we provided further proof of successful polar functionalization of PP. We showed that the contact angle of a droplet of deionized water decreased with grafting degree, proving an increase in polarity for PP-g-ES samples relative to the neat, parent PP. Transesterification of PP-g-ES with a fluorescent chromophore was used to demonstrate potential in reactive compatibilization. Finally, the little to no reduction in crystallinity coupled with moderate MW reductions resulted in PP-g-ES samples with little to no losses in mechanical and physical properties relative to the neat parent PP. Together, these results confirm that SSSP can be used to achieve direct ester functionalization of PP to high grafting yields and without the use of a polar monomer.

We claim:

1. A method of preparing a functionalized polymer, said method comprising:
   providing a mixture comprising a polymer component and organic peroxide; and
   applying a mechanical energy to said mixture through solid-state shear pulverization in the presence of cooling at least partially sufficient to maintain said polymer in a solid state during said pulverization, said pulverization at least partially sufficient to graft a peroxy derivative onto said polymer component, said pulverization providing a functionalized polymer.

2. The method of claim 1 wherein said polymer component is selected from polyolefins, copolymers of said polyolefins and combinations thereof.

3. The method of claim 2 wherein said polymer component is selected from polyethylene, polypropylene and copolymers thereof.

4. The method of claim 1 wherein said organic peroxide is selected from disubstituted peroxides of a formula RO—OR', where R and R' are independently selected from alkyl, cycloalkyl, alkenyl, alkenoyl, acryloyl, aryl, aroyl and acyl groups; and said peroxy derivative is selected from alkoxy, cycloalkoxy, alkenyloxy, alkenoyloxy, acryloyloxy, aroyl, aroyloxy and acyloxy moieties.

5. The method of claim 4 wherein said organic peroxide is benzoyl peroxide, and said peroxy derivative is a benzoyloxy moiety.

6. The method of claim 5 wherein said organic peroxide comprises about 0.01 wt. % to about 10 wt. % of said mixture.

7. The method of claim 1 wherein said mixture comprises a filler component selected from cellulose, rice husk ash, talc, silica, modified clay, unmodified clay, modified graphite, unmodified graphite, graphene, single-walled carbon nanotubes, multi-walled carbon nanotubes and combinations thereof.

8. The method of claim 7 wherein said filler component comprises about 0.1 wt. % to about 50 wt. % of said mixture.

9. The method of claim 1 wherein said grafting percentage is about 0.01% to about 100%.

10. A method of preparing a functionalized polymer, said method comprising:
providing a mixture comprising a polymer comprising a polypropylene component and an organic peroxide; and
applying a mechanical energy to said mixture through solid-state shear pulverization in the presence of cooling at least partially sufficient to maintain said polymer in a solid state during said pulverization, said pulverization at least partially sufficient to graft a peroxy derivative onto said polypropylene component, said pulverization providing a functionalized polymer.

11. The method of claim 10 wherein said polymer is a polypropylene.

12. The method of claim 10 wherein said organic peroxide is selected from disubstituted peroxides of a formula RO—OR', where R and R' are independently selected from alkyl, cycloalkyl, alkenyl, aryl, aroyl, alkenoyl, acryloyl and acyl groups; and said peroxy decomposition moiety is selected from alkoxy, cycloalkoxy, alkenyloxy, aroxy, acryloyloxy, aroyloxy and acyloxy moieties.

13. The method of claim 10 wherein said polymer is a polypropylene, and said organic peroxide is benzoyl peroxide.

14. The method of claim 10 wherein said functionalized polymer is blended with a polymer more polar than said polypropylene component of said polymer.

15. A method of functionalizing polypropylene with a benzoyloxy moiety, said method comprising:
providing a mixture comprising a polymer comprising a polypropylene component and benzoyl peroxide; and
applying a mechanical energy to said mixture through solid-state shear pulverization in the presence of cooling at least partially sufficient to maintain said polymer in a solid state during said pulverization, said pulverization at least partially sufficient to graft a benzoyloxy moiety onto said polypropylene component, said pulverization providing a benzoyloxy-functionalized polymer.

16. The method of claim 15 wherein said polymer is a polypropylene.

17. The method of claim 15 wherein said benzoyloxy-functionalized polymer is blended with a polymer more polar than said polypropylene.

18. The method of claim 17 wherein said functionalized polymer is blended with a nylon.

19. The method of claim 15 wherein said benzoyloxy moiety is up to about 0.50 wt. % of said polypropylene component.

20. A method of using solid-state shear pulverization to prepare a functionalized polymer, said method comprising:
providing a mixture comprising a polymer comprising a polypropylene component and a disubstituted organic peroxide of a formula RO—OR', wherein R and R' are independently selected from alkyl, cycloalkyl, alkenyl, alkenoyl, acryloyl, aroyl, aryl and acyl groups;
introducing said mixture to a solid-state shear pulverization apparatus, said apparatus comprising a cooling component; and
applying a mechanical energy to said mixture through solid-state shear pulverization in the presence of cooling at least partially sufficient to maintain said polymer in a solid state during said pulverization, said pulverization at least partially sufficient to graft a peroxy derivative into said polypropylene component, said derivative selected from alkoxy, cycloalkoxy, alkenoxy, alkenoyloxy, acryloyloxy, aroxy, aroyloxy and acyloxy moieties, said pulverization providing a functionalized polymer.

21. The method of claim 20 wherein said polymer is a polypropylene.

22. The method of claim 21 wherein said organic peroxide is benzoyl peroxide.

23. The method of claim 20 wherein said polymer is a polypropylene, and said organic peroxide is benzoyl peroxide.

24. A method of using solid-state shear pulverization to control molecular weight reduction during functionalization of polypropylene, said method comprising:
providing a mixture comprising a polypropylene component and benzoyl peroxide;
introducing said mixture into a solid-state shear pulverization apparatus, said apparatus comprising a cooling component; and
applying a mechanical energy to said mixture through solid-state shear pulverization in the presence of cooling at least partially sufficient to maintain polypropylene in a solid state during said pulverization, said pulverization at least partially sufficient to graft a benzoyloxy moiety onto polypropylene, said pulverization providing a benzoyloxy-functionalized polypropylene; and
annealing said functionalized polypropylene under vacuum conditions sufficient to remove said unreacted benzoyl peroxide from said functionalized polypropylene and suppress reduction of the molecular weight of said polypropylene component.

25. The method of claim 24 wherein said annealing is at a temperature sufficient to inhibit decomposition of said unreacted benzoyl peroxide.

26. The method of claim 24 wherein said molecular weight reduction of said polypropylene component is less than about 30%.

* * * * *